2,726,225
Patented Dec. 6, 1955

2,726,225

POLYVINYL ACETATE PLASTICIZED WITH A POLYESTER

Irving Pockel, Cambridge, Mass., assignor to Cambridge Industries Company, Cambridge, Mass., a corporation of Massachusetts No Drawing. Application April 14, 1954, Serial No. 423,231

5 Claims. (Cl. 260—45.4)

This invention relates to resinous, non-migrating plasticizers for polyvinyl acetate and to the polyvinyl acetate compositions plasticized therewith. By polyvinyl acetate is meant either pure polyvinyl acetate or commercial polyvinyl acetate in which less than about 5% of the acetate radicals have been changed or hydrolyzed so that they are replaced by hydroxyl groups.

Resinous non-migrating plasticizers for polyvinyl acetate which are products of the reaction of a member selected from the group of adipic acid and succinic anhydride and a member selected from the group of di-ethylene glycol and dipropylene glycol are described in U. S. Patent 2,611,756 dated September 23, 1952. The present invention provides a new series of resinous, non-migrating plasticizers, having the unique property of plasticizing polyvinyl acetate, which are the substantially neutral products of the reaction of a member selected from the group consisting of terephthalic acid, isophthalic acid, and the lower alkyl esters of these acids, with diethylene glycol.

A primary object of the present invention is the embodiment of resinous type plasticizers which are compatible with an aqueous dispersion of polyvinyl acetate and will not migrate out of the films or other products made of the polyvinyl acetate and plasticized therewith.

A further object of the invention is the embodiment of dispersions of polyvinyl acetate compositions containing a plasticizer according to the present invention incorporated therein and suitable for practical applications, such as the preparation of plasticized films, coating, filaments and other articles. These plasticized compositions are the basis for improved adhesives, laminations, heat seal coatings, binders for nonwoven fabrics, coated paper and fabrics, grease-proof paper and fiberboard, water emulsion paints, face and backing coatings for linoleum, backing compounds for rugs and carpets, washable sizes for textiles, and the like.

A further object of the invention is to provide a new composition comprising essentially polyvinyl acetate plasticized with a non-migrating viscous liquid plasticizer containing as its essential plasticizing ingredient the liquid polymeric polyester of an acid selected from the group consisting of isophthalic acid, terephthalic acid and/or mixtures of isophthalic and terephthalic acid and diethylene glycol.

These reaction products may advantageously be modified by partial trans-esterification with monobasic acids such as benzoic or toluic acid to adjust the viscosity of the final product. It is feasible to incorporate as much as 35% of such a monobasic aromatic acid in the cook. Thus an indicated hereinafter the amount of monobasic aromatic acid may be 0% and it may be up to 35% on the basis of the total amount of polyester plasticizer. The monobasic aromatic acid incorporated in an amount up to 35% may bring the acid number of the substantially neutral polyester from about 0–3 to about 35–40 without having any deleterious effect upon the plasticizing efficiency and compatibility of the plasticizing agent of the invention used with polyvinyl acetate.

The neutral plasticizer of the present invention may be modified with up to 15% by weight of other polyesters as are obtained from polyhydric alcohols and polybasic acids as hereinafter defined. These polyester modifiers are obtained from polyhydric alcohols such as dipropylene glycol, glycerol, ethylene glycol, hexalene glycol (which is a mixture of six carbon atom glycols of the general formula $C_6H_{12}(OH)_2$), triethylene glycol, trimethanol propane, etc. and polybasic acids such as succinic, sebacic, azelaic, maleic, fumaric, phthalic, etc. The polyester modifiers may be used by the incorporation of minor amounts in the cook, in no case more than 15% being used.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

Preferred products, however, are exemplified in the following examples. These examples are entirely illustrative and not at all limitative in character. In these examples, parts by weight bear the same relation to parts by volume as does the kilogram to the liter. All temperatures are in degrees Fahrenheit unless otherwise indicated.

Example 1

501 parts by weight of a mixture of 85% dimethyl isophthalate and 15% dimethyl terephthalate, and 286 parts by weight of diethylene glycol are placed in a three-necked Pyrex glass flask and heated to a temperature of 450° F. over a period of 1½ hours and maintained at this temperature for 3½ hours. On cooling 665 parts of a light colored, very viscous liquid was obtained which, when warm, could easily be stirred into a polyvinyl acetate emulsion containing 54% of polyvinyl acetate. Films cast from this plasticized polyvinyl acetate emulsion were clear and rubber-like in nature.

Example 2

400 parts of a mixture of 85% dimethyl isophthalate and 15% dimethyl terephthalate, and 239 parts of diethylene glycol and 0.17 part of sublimed litharge were placed in a three-necked Pyrex flask and heated to 450° in 1½ hours and maintained at this temperature for 2½ hours. On cooling 409 parts of a viscous liquid having properties similar to the product of Example 1 was obtained.

Example 3

400 parts of dimethyl terephthalate, 239 parts of diethylene glycol and 0.17 part of sublimed litharge were placed in a three-necked Pyrex flask and heated to 450° F. in 1½ hours and maintained at this temperature for 2½ hours. On cooling 422 parts of a viscous liquid having properties similar to the product of Example 1 was obtained.

Example 4

122 parts of benzoic acid, 292 parts of diethylene glycol and 0.25 part of sublimed litharge were placed in a three-necked Pyrex flask and heated to 450° in 1½ hours. After cooling 388 parts of a mixture of 85% dimethyl isophthalate and 15% dimethyl terephthalate were added and the mixture heated to 450° F. and maintained at this temperature for 1½ hours. On cooling 502 parts of a viscous liquid having properties similar to the product of Example 1 was obtained.

Example 5

136 parts of toluic acid, 292 parts of diethylene glycol and 0.25 part of sublimed litharge were placed in a three-necked Pyrex flask and heated to 450° F. in 1½ hours. After cooling 388 parts of dimethyl terephthalic acid were added and the mixture heated to 450° F. and maintained at this temperature for 1½ hours. On cooling 540 parts of a viscous liquid having properties similar for the product of Example 1 was obtained.

Example 6

25 parts of the viscous liquid resinous plasticizer of Example 1 were mixed with 100 parts of an emulsion of polyvinyl acetate containing 54% solid polyvinyl acetate and 46% water. Some thickening of the emulsion took place and 20 parts of water were added to restore the original viscosity.

Films were cast and were found to be clear and rubber-like in nature. Asphalt impregnated felt was coated with this composition and the non-migrating properties of the polyester plasticizer were demonstrated by top coating with a white linseed oil paint which dried to a good white finish indicating no bleed through of the asphalt through the plasticized polyvinyl acetate undercoat.

Woven cotton fabric coated with this plasticized polyvinyl acetate coating showed no stiffening or loss of plasticizer even when heated to temperatures as high as 300° F. for several hours.

Example 7

25 parts of the viscous liquid resinous plasticizer of Example 1 were mixed with 100 parts of a 60% solution of polyvinyl acetate in methyl alcohol. Films were cast from this composition and were found to be clear and rubber like in nature.

It is thought that the invention and its advantages will be understood from the foregoing description and it is apparent that various changes may be made in the form, construction and arrangement of the parts without departing from the spirit and scope of the invention or sacrificing its material advantages, the embodiments hereinbefore described being merely preferred embodiments thereof.

What is claimed is:

1. A composition of matter comprising a polymer selected from the group consisting of polyvinyl acetate and polyvinyl acetate in which less than about 5% of the acetate groups have been hydrolyzed and, as a plasticizer therefor, a non-migrating, viscous liquid resinous polyester obtained by reacting diethylene glycol with an acid selected from the group consisting of terephthalic acid, isophthalic acid, and mixtures of terephthalic acid and isophthalic acid, and up to 35%, relative to the total amount of polyester, of a monobasic aromatic acid selected from the group consisting of benzoic acid and toluic acid.

2. A composition of matter comprising a polymer selected from the group consisting of polyvinyl acetate and polyvinyl acetate in which less than about 5% of the acetate groups have been hydrolyzed and, as a plasticizer therefor, a non-migrating, viscous liquid resinous polyester obtained by reacting diethylene glycol with terephthalic acid.

3. A composition of matter comprising a polymer selected from the group consisting of polyvinyl acetate and polyvinyl acetate in which less than about 5% of the acetate groups have been hydrolyzed and, as a plasticizer therefor, a non-migrating, viscous liquid resinous polyester obtained by reacting diethylene glycol with isophthalic acid.

4. A composition of matter comprising a polymer selected from the group consisting of polyvinyl acetate and polyvinyl acetate in which less than about 5% of the acetate groups have been hydrolyzed and, as a plasticizer therefor, a non-migrating, viscous liquid resinous polyester obtained by reacting diethylene glycol with isophthalic acid and up to 35% of benzoic acid.

5. A composition of matter comprising a polymer selected from the group consisting of polyvinyl acetate and polyvinyl acetate in which less than about 5% of the acetate groups have been hydrolyzed and, as a plasticizer therefor, a non-migrating, viscous liquid resinous polyester obtained by reacting diethylene glycol with isophthalic acid and up to 35% of toluic acid.

References Cited in the file of this patent

UNITED STATES PATENTS

| | | |
|---|---|---|
| 2,190,789 | Hubbuch | Feb. 20, 1940 |
| 2,606,162 | Coffey et al. | Aug. 5, 1952 |
| 2,611,756 | Pockel | Sept. 23, 1952 |

OTHER REFERENCES

Chem. Eng. News, vol. 26, page 719, March 8, 1948.